United States Patent
Cook et al.

(10) Patent No.: US 9,301,024 B2
(45) Date of Patent: Mar. 29, 2016

(54) MODULAR FREQUENCY BASED FIBER TRANSPORT AND RADIO TRANSPORT REPEATER PLATFORM FOR DIVERSE RADIO FREQUENCY CONFIGURABLE DEPLOYMENTS

(75) Inventors: Jason Cook, Irvine, CA (US); Tim Gossard, Eastvale, CA (US); James K. Custer, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 13/545,353

(22) Filed: Jul. 10, 2012

(65) Prior Publication Data

US 2013/0016475 A1   Jan. 17, 2013

Related U.S. Application Data

(60) Provisional application No. 61/507,783, filed on Jul. 14, 2011.

(51) Int. Cl.
*H04Q 1/02* (2006.01)

(52) U.S. Cl.
CPC ........................... *H04Q 1/02* (2013.01)

(58) Field of Classification Search
CPC .......... H05K 7/20445; H05K 7/20681; H05K 1/144; H05K 7/2039; H05K 7/20409; H05K 5/04; H05K 7/20163; H05K 7/20536; H05K 9/0062; H05K 9/0037; H05K 9/0073; H04L 25/20; H04Q 1/035; H04Q 2201/06; H04Q 1/02; H04Q 1/025; H04Q 1/15; H04B 7/0817; H04W 88/08; G01L 3/02; G08G 1/20
USPC ............. 455/7, 11.1, 16, 561, 349, 90.3, 500; 361/679, 716, 690, 687, 379, 709, 688; 379/338, 348
See application file for complete search history.

(56) References Cited

U.S. PATENT DOCUMENTS

| | | | | |
|---|---|---|---|---|
| 5,522,042 | A * | 5/1996 | Fee et al. | 709/226 |
| 6,292,556 | B1 * | 9/2001 | Laetsch | 379/338 |
| 6,761,212 | B2 * | 7/2004 | DiPaolo | 165/122 |
| 6,785,138 | B1 * | 8/2004 | Rapey | 361/704 |
| 7,471,512 | B1 * | 12/2008 | Strickland | 361/679.41 |
| 2002/0071251 | A1 * | 6/2002 | Gerlock et al. | 361/704 |
| 2003/0078015 | A1 * | 4/2003 | Laetsch | 455/90 |
| 2005/0094359 | A1 * | 5/2005 | Lee et al. | 361/679 |
| 2009/0170444 | A1 * | 7/2009 | Retnasothie et al. | 455/73 |
| 2013/0301223 | A1 * | 11/2013 | Nelson et al. | 361/716 |

* cited by examiner

*Primary Examiner* — Sujatha Sharma
(74) *Attorney, Agent, or Firm* — Schwegman Lundberg & Woessner, P.A.

(57) ABSTRACT

A modular design repeater platform that allows unique deployment configurations and rapid upgrading, and modifications to a deployed system in a wireless or fiber optic network system is disclosed. The platforms include fiber transport and radio transport systems. The system includes a base unit coupled to one or more RF modules. The components employ a flange—recess design and pedestal mounts to securely couple the components together.

19 Claims, 9 Drawing Sheets

MODULAR FREQUENCY BASED FIBER TRANSPORT AND RADIO TRANSPORT REPEATER PLATFORM FOR DIVERSE RADIO FREQUENCY CONFIGURABLE DEPLOYMENTS

RELATED APPLICATION INFORMATION

The present application claims priority under 35 U.S.C. Section 119(e) to U.S. Provisional Patent Application Ser. No. 61/507,783 filed Jul. 14, 2011, the disclosure of which is incorporated herein by reference in its entirety.

BACKGROUND OF THE INVENTION

1. Field of the Invention

The present invention relates in general to communication systems and components. More particularly, the invention is directed to configurable platforms for wireless and fiber optic communication systems.

2. Description of the Prior Art and Related Background Information

Modern wireless and fiber optic platforms may be configured to meet specific site requirements. However, many conventional platforms are not adapted to be readily configured or modified in the field.

Accordingly, a need exists to provide configurable communication platforms.

SUMMARY OF THE INVENTION

In a first aspect, the present invention provides an electronics module system comprising a first RF electronics module having a flange extending away from the top surface of the first RF electronics module, and a second RF electronics module having a flange extending away from the top surface of the second RF electronics module. The electronics module system further comprises a controller electronics module having first and second recesses on the top surface thereof, the recesses receiving and engaging the flanges of the first and second RF electronics module when the first and second RF electronics modules are mated to the controller electronics module.

In a preferred embodiment, the electronics module system further comprises a threaded recess hole formed in the recess of the first RF electronics module, a flange through-hole formed in the flange, the flange through-hole positioned to align with the threaded recess hole when the first RF electronics module is mated to the controller electronics module, and a mechanical fastener coupling the first RF electronics module and the controller electronic modules when the first RF electronics module is mated to the controller electronics module. A plurality of first pedestal mounts are preferably disposed at the corners of the first RF electronics module. A plurality of second pedestal mounts are preferably disposed at the corners of the controller electronics module. The first pedestal mounts adjacent to a first mating surface of the first RF electronic module preferably having protrusions extending away in a direction orthogonal to the first mating surface, the first mating surface abutting the flange. The second pedestal mounts adjacent to a second mating surface of the controller electronics module preferably having notches inward in a direction orthogonal to the second mating surface, the second mating surface abutting the recess. The notches are preferably shaped and disposed to receive the protrusions when the first electronics assembly is mated to the second electronics assembly. The electronics module system preferably further comprises a third RF electronics module having a flange extending away from the top surface of the third RF electronics module, and a fourth RF electronics module having a flange extending away from the top surface of the fourth RF electronics module. The first RF electronics module preferably further comprises a recess on the top surface of the first RF electronics module receiving the flange extending away from the top surface of the third RF electronics module. The second RF electronics module preferably further comprises a recess on the top surface of the second RF electronics module receiving the flange extending away from the top surface of the fourth RF electronics module. The first, second, third, and fourth RF electronics modules preferably operate at a first, second, third, and fourth differing frequency bands. The electronics module system preferably comprises an RF repeater adapted for a wireless network.

In another aspect, the present invention provides an electronics module having a body having a top surface, a bottom surface, and first and second side surfaces both connecting the top surface to the bottom surface, a flange extending from the top surface away from the second side surface, the flange disposed generally parallel with the top surface, and a recess formed on the top surface extending inward from the first side surface, the recess having a shape generally inverse to the shape of the flange.

In a preferred embodiment, the electronics module further comprises a set of four pedestal mounts disposed at the corners of the bottom surface supporting the electronics module, where a first set of two pedestal mounts of the four pedestal mounts disposed adjacent to the second surface preferably each have a protrusion extending away from the second surface, and a second set of two pedestal mounts disposed adjacent to the first side surface preferably each have a notch shaped and positioned to correspond with the protrusions. An integrated handle is preferably coupled to the top surface. The flange is preferably tapered such that the width of the flange distal to second surface is less than the width proximate to the second surface. The electronics module preferably further comprises a threaded recess hole formed in the recess on the top surface, and a flange through-hole formed in the flange, the flange through-hole positioned to correspond with the position of the threaded recess hole when coupled to another module. The electronics module preferably further comprises front and back surfaces both connecting the top surface to the bottom surface, the front and back surfaces abutting the first and second side surfaces to form the body exterior, a first set of vertical cooling fins disposed on the front surface, and a second set of vertical cooling fins disposed on the back surface. The electronics module preferably comprises an RF module.

In another aspect, the present invention provides an electronics module, comprising a body having a top surface, a bottom surface, and first and second side surfaces both connecting the top surface to the bottom surface, a first recess formed on the top surface extending inward from the first side surface, and a second recess formed on the top surface extending inward from the second side surface and symmetrically oriented opposite to the first recess.

In a preferred embodiment, the electronics module preferably further comprises a set of four pedestal mounts disposed at the corners of the bottom surface supporting the electronics module and providing a space having coupling connectors to interface with the bottom surface and extend to adjacent modules. Each of the four pedestal mounts preferably have a notch extending inward toward the center of the bottom surface. The first recess is preferably tapered such that the width of the first recess distal to the first side surface is less than the width of the first recess adjacent to the first side surface, and the second recess is tapered such that the width of the second recess distal to the second side surface is less than the width of the second recess adjacent to the second surface configured symmetrically but opposite to the first recess. A first threaded recess hole is preferably formed in the first recess on the top surface, and a second threaded recess hole formed in the second recess on the top surface. The electronics module preferably further comprises front and back surfaces both connecting the top surface to the bottom surface, the front and back surface abutting the first and second side surfaces to form the body exterior, and a set of vertical fins disposed on the front surface. The electronics module preferably comprises a cellular communications base unit.

Further features and aspects of the invention are set out in the following detailed description.

DETAILED DESCRIPTION OF THE INVENTION

Further features and advantages of embodiments will be appreciated from the following detailed description. Embodiments provide a modular concept for ease of deployment and configurability in a repeater platform.

One or more embodiments provide a modular concept repeater platform for both fiber transport ("FT") and radio transport ("RT") systems that provide a diverse, frequency configurable (including adding and subtracting frequency bands) platform with no adverse effects or required modifications to an initial deployment structure in a wireless network system.

Figure 1:
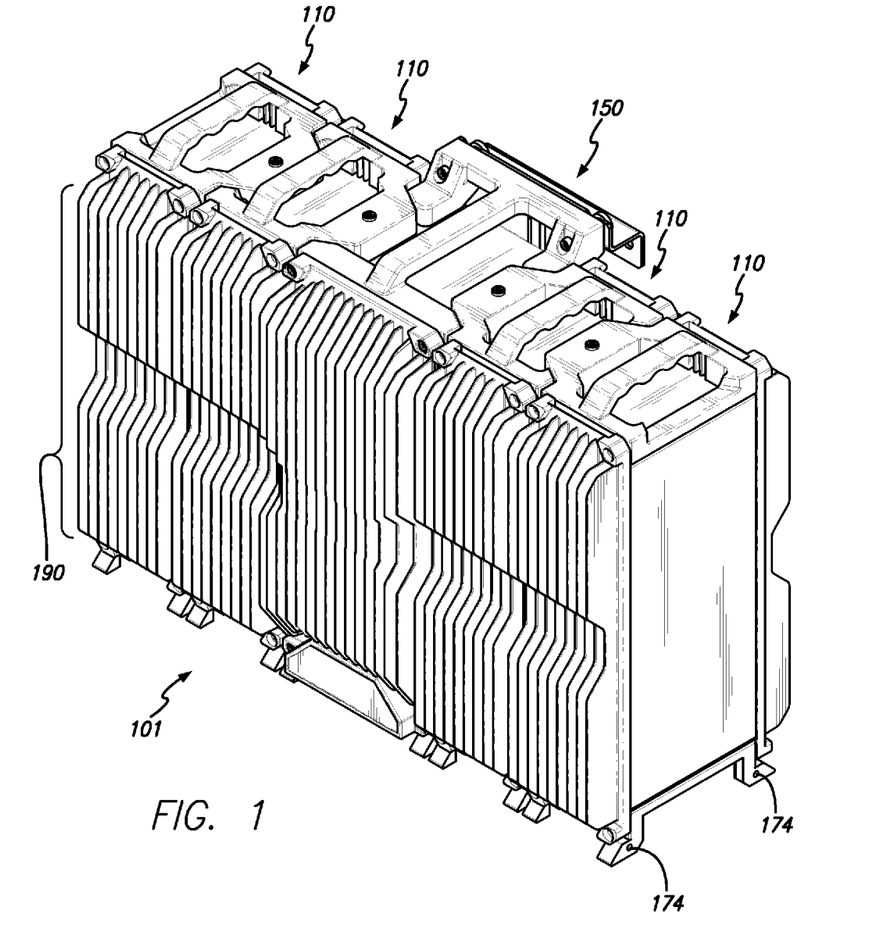
FIG. 1 is an isometric view of a fiber transport ("FT") or a radio transport ("RT") system with four radio frequency ("RF") units mounted to a single base unit or controller unit to create a fully deployed platform.

FIG. 1 shows an isometric view of the repeater platform 101 utilizing four radio frequency ("RF") modules 110 connected to a single base unit 150 or controller unit in a quad band deployment. These modules contain RF transmission and base station equipment well known in the art including RF power amplifiers and RF digital communications equipment operable at different frequency bands, and may operate in four different frequency bands in a quad band system for example. This represents the preferred maximum deployment for this platform 101. The platform 101 also supports single, dual, and triple band platforms fully configurable by adding and subtracting RF modules 110 to the base unit 150 in the quantity desired for the deployment, with up to four separate and independent RF modules 110. The RF modules 110 may be configured for any radio frequency band. All deployment configurations utilize the same fastening mechanisms and cable connection approach as shown in the quad band depiction.

Figure 2:
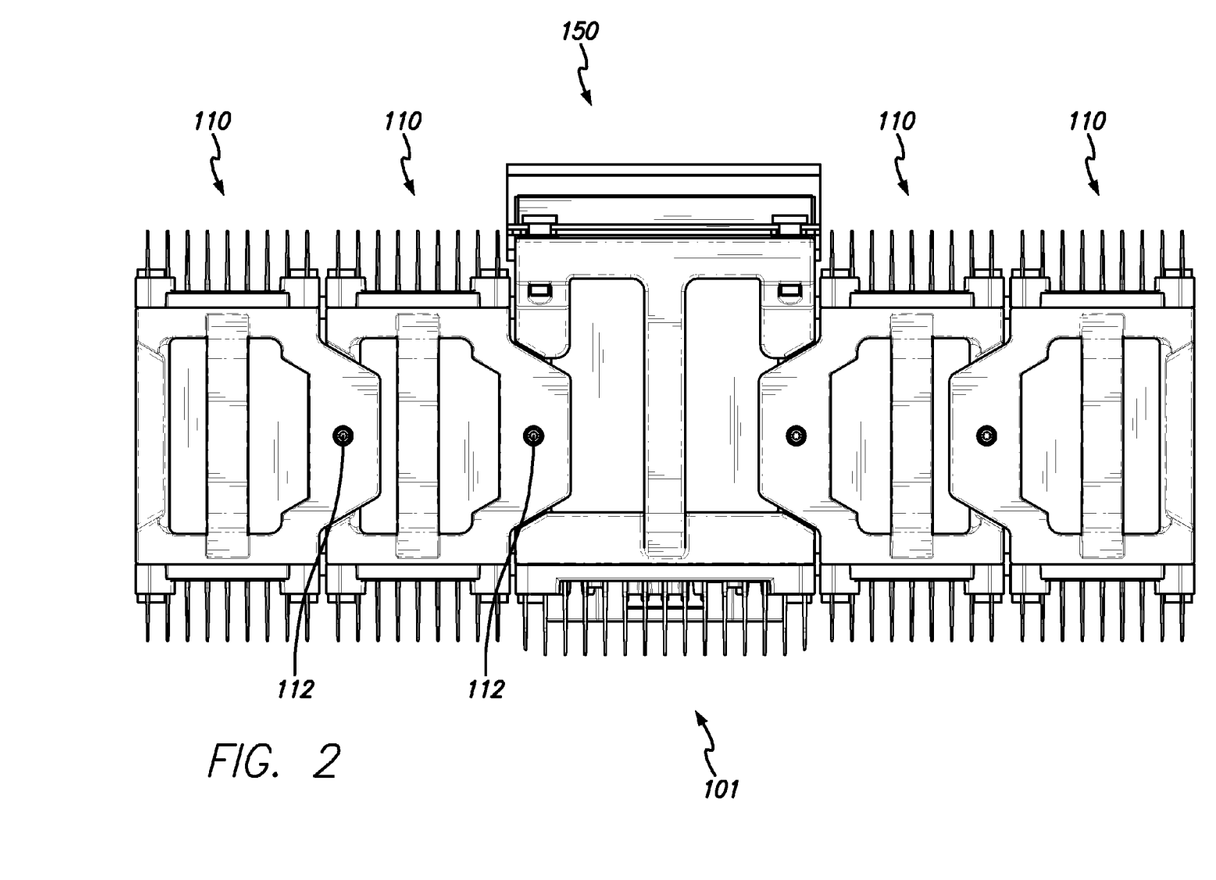
FIG. 2 is a top view of the platform showing an exemplary fastening technique and integrated fastening features for the platform.

FIG. 2 shows a top view of the fastening and alignment mechanism of the RF module 110 to the base unit 150 or controller unit and to other RF modules. The top of the RF module 110 provides a dovetail alignment feature and hook design for the initial placement of the RF module 110 to the base unit 150 or controller unit and to an adjacent RF module 110. The RF module 110 is designed to be symmetrical so that it can be deployed on the right hand or left hand side of the base unit 150 or controller unit or another RF module 110. The unit is then fastened to the adjacent unit, such as two adjacent RF units 110 or an RF unit 110 coupled to a base unit 150 via captive hardware and receptacles described below.

Figure 2B:
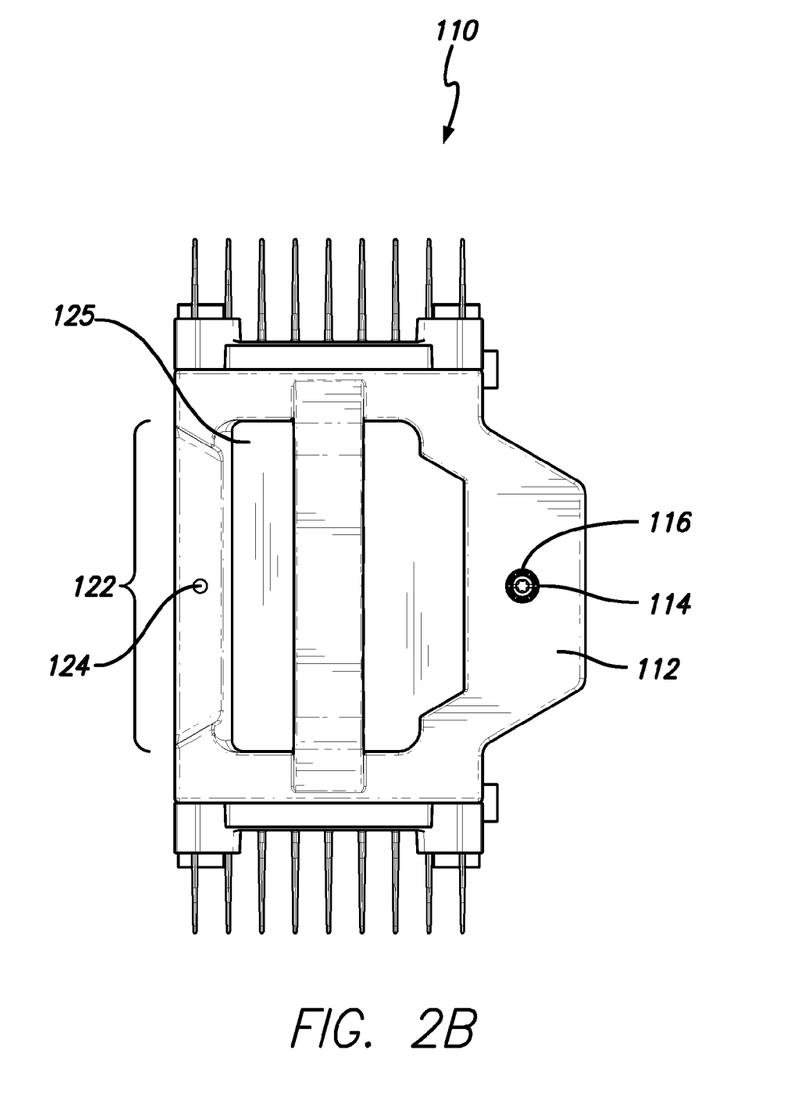
FIG. 2B is a top view of a RF unit showing the integrated fastening feature.
Figure 2C:
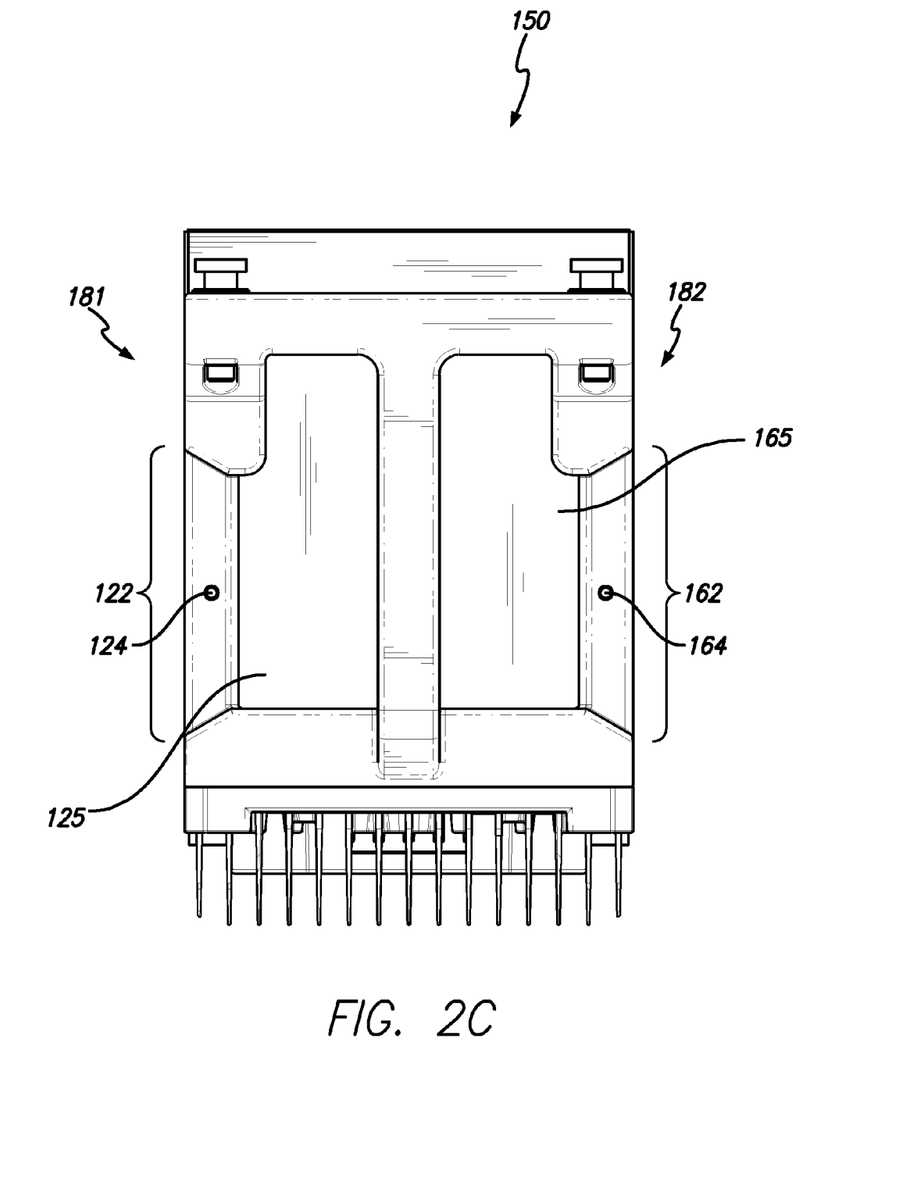
FIG. 2C is a top view of a base unit of control module showing the integrated fastening feature.

FIG. 2B and FIG. 2C show respectively top views of the RF module 110 and base unit 150 or controller unit in the unmated condition. These views provide a detailed view of the male and female connection options that are employed in the design. The RF module 110 has one male flange 112 and one female recess 122 connection option. This allows for the RF module 110 to be connected to the base unit 150 or controller unit or to another RF module 110 both in a right hand or left hand deployment. FIGS. 2B and 2C also demonstrate the unique modularity and deployment configuration options to the product.

Figure 3:
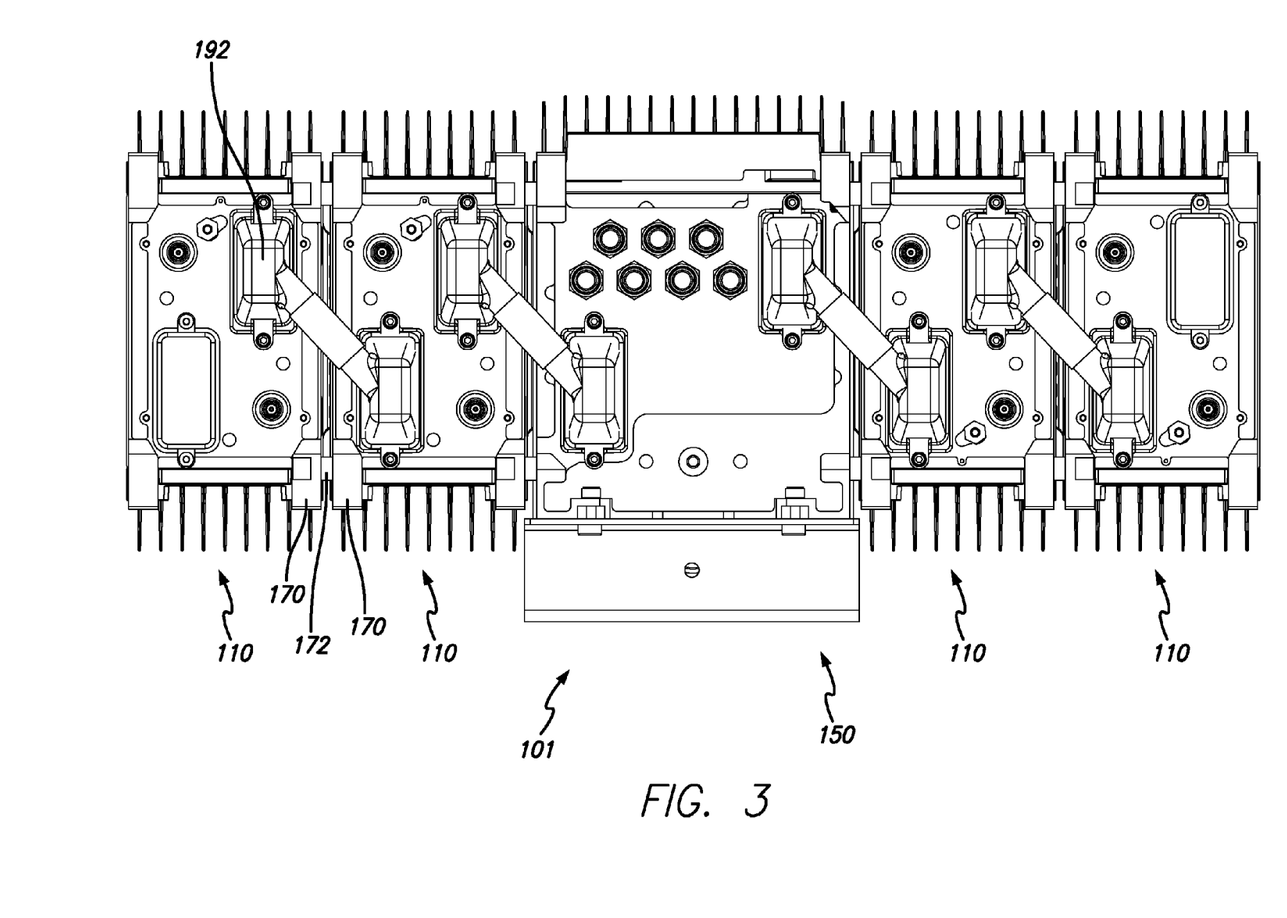
FIG. 3 is a bottom view of the platform showing the fastening technique and integrated fastening features for the platform and the cable connection between modules that provides a conduit for RF, high speed digital, and direct current ("DC") signals between modules.

FIG. 3 shows a bottom view of the fastening and alignment mechanism. The RF module utilizes pedestal features described below that act both to allow the unit to be placed on the ground prior to installation as well as the features to connect the RF module 110 to an adjacent module whether that be the base unit 150 or controller unit or to another RF module 110. The base mounting features utilizes captive and tamper proof hardware for the fastening mechanism.

Figure 3B:
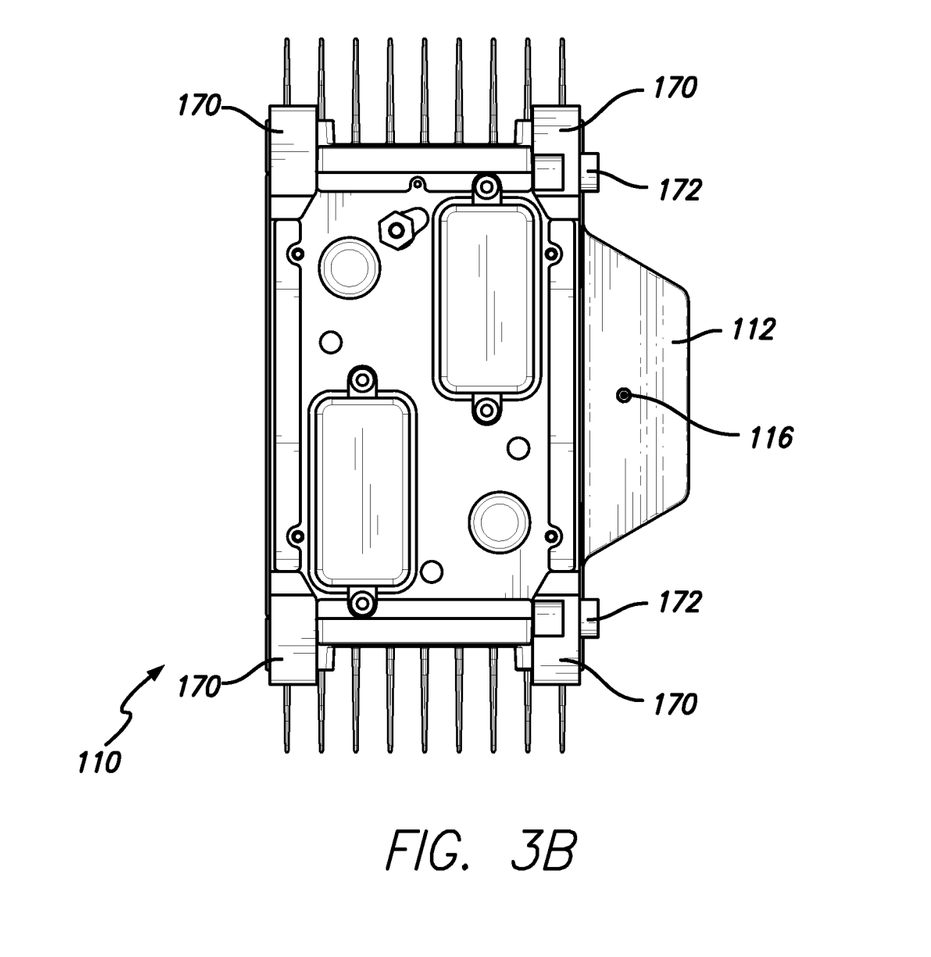
FIG. 3B is a bottom view of an exemplary RF unit showing the fastening technique and integrated fastening features.
Figure 3C:
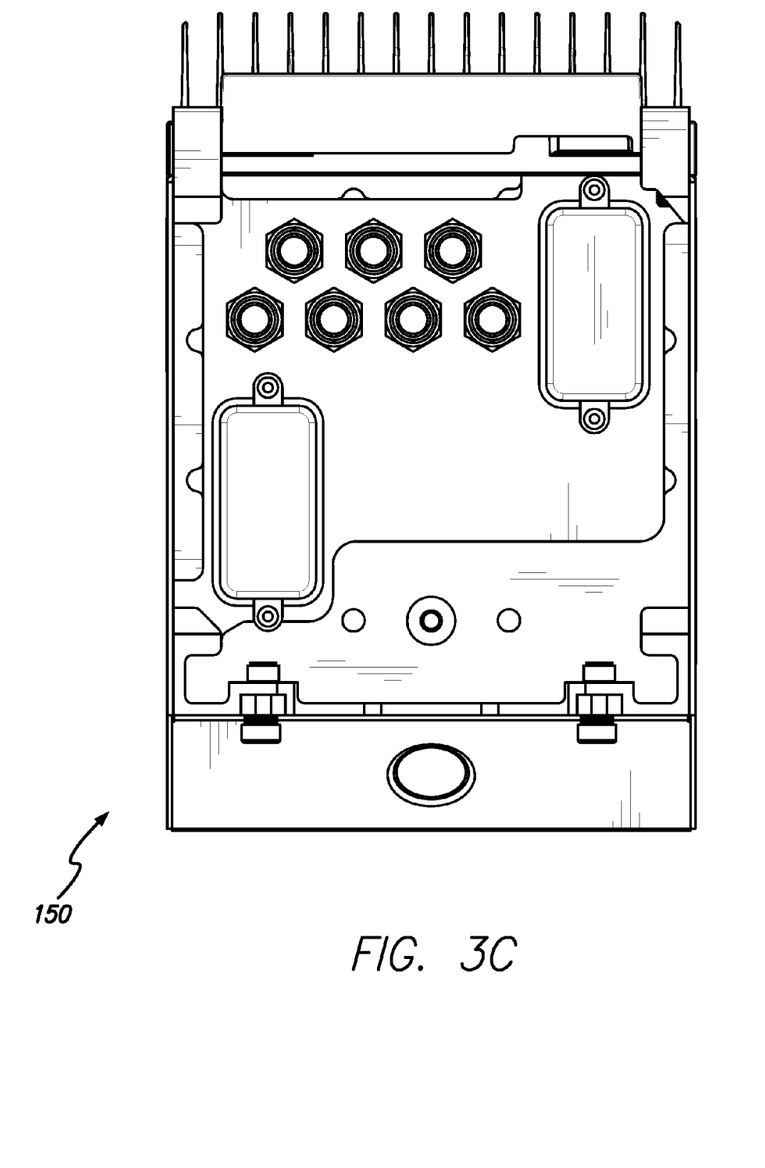
FIG. 3C is a bottom view of an exemplary base unit or controller unit showing the fastening technique and integrated fastening features.

FIGS. 3B and FIG. 3C show respectively bottom views of the RF module 110 and base unit 150 or controller unit in the unmated condition. These views provide a detailed view of the male and female connection options that are employed in the design. The RF module 110 has one male flange 112 and one female recess 122 connection option. This allows for the RF module 110 to be connected to the base unit 150 or controller unit or to another RF module 110 both in a right hand or left hand deployment. It also demonstrates the unique modularity and deployment configuration options to the product.

Figure 4:
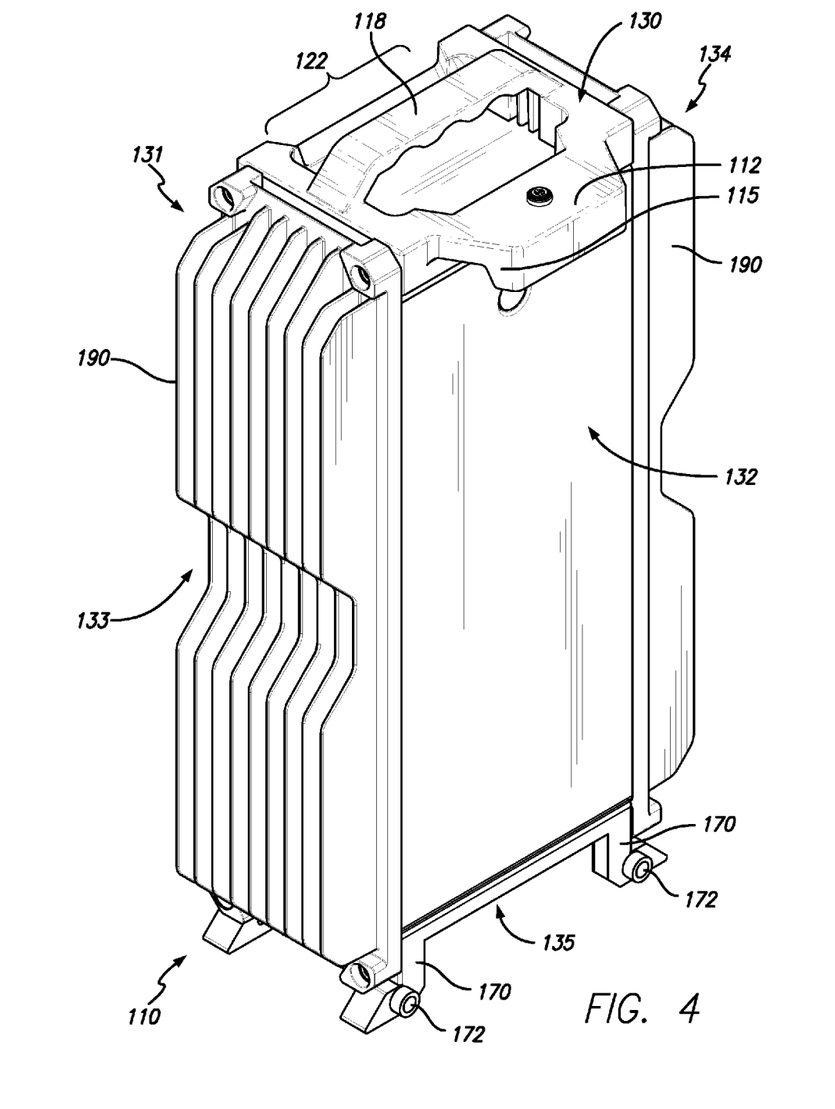
FIG. 4 is an isometric view of the RF unit.

Referring to the RF module 110, as depicted in FIG. 4, the RF module 110 may have a generally rectangular prismatic body having a top surface 130, a bottom surface 135, and two side surfaces depicted in FIG. 4 as a left or first side surface 131 and a right or second side surface 132 both connecting the top surface 130 to the bottom surface 135. The second side surface 132 is disposed on a side opposite to the first side surface 131. In an embodiment, the top surface 130 may be a contoured frame. The RF module 110 has a flange 112 which extends away from the second side surface 132 and is disposed generally parallel with the top surface 130. In an embodiment, the flange 112 has a lip 115 extending downward distal from the second side surface 132.

As shown in FIG. 2B, the flange 112 may have a flange through-hole 114 formed near the center of the flange 112. A bolt or other mechanical fastener 116 may be held captive in the flange through-hole 114. The flange 112 may be tapered such that the width of the flange 112 distal to second side surface 132 is less than the width proximate to the second side surface 132. The top surface 130 may be further shaped to provide an integrated handle 118.

As shown in FIGS. 2B and 4, the RF module 110 may also have a recess 122 formed on the top surface 130 extending inward from the first side surface 131. The recess 122 has a shape inverse to the shape of the flange 112 so that the recess 122 may receive and mate with a flange 112 of an adjacent RF module 110. The recess 122 may also have a groove 125 which is shaped to accommodate the lip 115 of the flange 112.

The RF module 110 has a threaded recess hole 124 formed in the recess 122 on the top surface 130. Adjacent RF modules are securely coupled with each other as a result of the recess 122 accepting the flange 112 and a mechanical fastener 116 or bolt securing the adjacent units together. The taper of the flange 112 engaging with the recess 122 and the lip 115 engaging with the groove 125 provide further mechanical rigidity.

Pedestal mounts 170 may be employed to provide additional mechanical rigidity between adjacent RF modules 110 or an RF module 110 and a base unit 150. As illustrated in FIGS. 3B and 4, a set of four pedestal mounts 170 may be disposed at the corners of the bottom surface 135 to support the RF module 110. In an embodiment, a first set of two pedestal mounts 170 of the four pedestal mounts 170 are disposed adjacent to the second side surface 132 where each has a protrusion 172 extending in a direction away from the second side surface 132. As shown in FIG. 1, a second set of two pedestal mounts 170 are disposed adjacent to the left first surface each have a notch 174 shaped and positioned to correspond with the protrusions.

The RF module 110 may have fins 190 to facilitate cooling of the electronics. As illustrated in FIG. 4, the RF module may have a front third surface 133 and the back fourth surface 134 which connect the top surface 130 to the bottom surface 135 to form the body. The RF module 110 may have a first set of fins 190 on a front third surface 133 and a second set of fins 190 on the back fourth surface 134.

Figure 5:
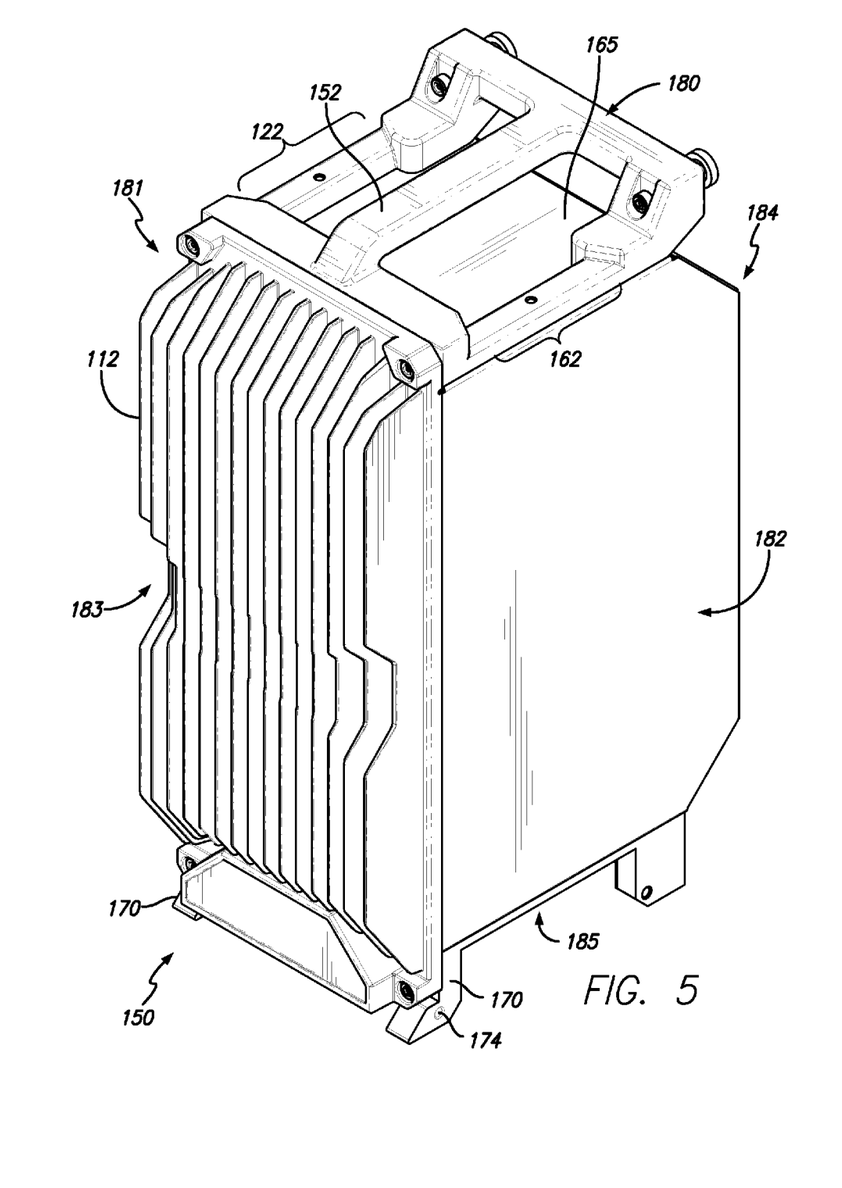
FIG. 5 is an isometric view of the base unit.

Referring to the base unit 150, as depicted in FIG. 5, the base unit 150 may have a generally rectangular prismatic body having a top surface 180, a bottom surface 185, and two side surfaces depicted in FIG. 5 as a left or first side surface 181 and a right or second side surface 182 both connecting the top surface 180 to the bottom surface 185. The second side surface 182 is disposed on a side opposite to the first side surface 181. In an embodiment, the top surface 180 may be a contoured frame.

As illustrated in FIG. 2C, the base unit 150 has a first recess 122 formed on the top surface 180 extending inward from the first side surface 181. The base unit 150 also has second recess 162 formed on the top surface 180 extending inward from the second side surface 182. A first threaded recess hole 124 may be formed in the first recess 122 on the top surface 180, and a second threaded recess hole 164 may be formed in the second recess 162 on the top surface 180. In an embodiment, the first recess 122 is tapered such that the width of the recess 122 distal to the first side surface 181 is less than the width of the recess 122 adjacent to the first side surface 181. The second recess 162 may also be tapered such that the width of the recess 162 distal to the second side surface 182 is less than the width of the recess 162 adjacent to the second side surface 182. Recesses 122 and 162 may also have a groove 125 and 165 respectively which are shaped to accommodate the lip 115 of the flange 112. The taper of the flange 112 engaging with the recesses 122 and 162 and the lip 115 engaging with the grooves 125 or 165 provide further mechanical rigidity.

Pedestal mounts may also be employed in the base unit 150 to provide additional mechanical rigidity between the base unit 150 and an adjacent RF module 110. As illustrated in FIG. 5, a set of four pedestal mounts 170 are disposed at the corners of the bottom surface 185 to support the base unit 150. Each of the four pedestal mounts 170 have a notch 174 extending inward toward the center of the bottom surface 180.

The base unit 150 may also have fins 112 to facilitate cooling of internal electronics. As illustrated in FIG. 5, the base unit 150 has a front third surface 183 and a back fourth surface 184 both connecting the top surface 180 to the bottom surface 185 abutting the first side surface 181 and the right second surface to form the body. A first set of vertical fins 112 may be disposed on the front third surface 183.

Referring to the system 101 as shown in FIG. 1, the base unit 150 may be coupled with one or more RF modules 110 to form a system 101. The system 101 has one or more RF modules 110 each having a flange 112 extending away from the top surface 130 of the RF module. The system 101 also has one base unit 150 having a recess 122 on the top surface of the base unit 150 for receiving and engaging the flange 112 of the RF modules 110 module when the RF module 110 is mated to the base unit 150. As discussed above, the recess of the base unit 122 has a threaded recess hole 124 and the flange 112 has a flange through-hole 114 such that the flange through-hole 114 is positioned to align with the threaded recess hole 124 when the RF module 110 is mated to the base unit 150.

As the RF module 110 is mated with the base unit 150, the pedestal mounts 170 on the base unit 150 couple and engage with the pedestal mounts on the RF module 110 as the notches 174 and the protrusions 172 of the corresponding pedestal mounts 170 are mated.

As shown in FIG. 3, an electrical connector assembly 192 is mounted on the bottom surfaces of the base unit 150 and the RF module 110. The electrical connector assembly 192 carries RF signals, digital communication signals, and DC power among the system 101. Details of a suitable connector structure are found in U.S. Provisional Application Ser. No. 61/507,808 filed Jul. 14, 2011, the disclosure of which is incorporated herein by reference in its entirety.

The present invention has been described primarily as structures and methods for interconnecting module components for RF and fiber optic systems. The description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. An electronics module system, comprising:
 a first RF electronics module having a flange extending away from a top surface of the first RF electronics module;
 a second RF electronics module having a flange extending away from a top surface of the second RF electronics module; and
 a controller electronics module having first and second recesses formed on an exterior of a top surface of the controller electronics module thereof, walls of the first and second recesses each having a shape complementary to shapes of the flanges of the first and second RF electronics modules, the recesses receiving and the recess walls engaging the flanges of the first and second RF electronics modules when the first and second RF electronics modules are mated to the controller electronics module.

2. An electronics module system as set out in claim 1, further comprising:
a threaded recess hole formed in the recess of the first RF electronics module;
a flange through-hole formed in the flange, the flange through-hole positioned to align with the threaded recess hole when the first RF electronics module is mated to the controller electronics module; and
a mechanical fastener coupling the first RF electronics module and the controller electronic modules when the first RF electronics module is mated to the controller electronics module.

3. An electronics module system as set out in claim 1, further comprising:
a plurality of first pedestal mounts disposed at the corners of the first RF electronics module; and
a plurality of second pedestal mounts disposed at the corners of the controller electronics module.

4. An electronics module system as set out in claim 3, wherein:
the first pedestal mounts adjacent to a first mating surface of the first RF electronic module having protrusions extending away in a direction orthogonal to the first mating surface, the first mating surface abutting the flange; and
the second pedestal mounts adjacent to a second mating surface of the controller electronics module having notches inward in a direction orthogonal to the second mating surface, the second mating surface abutting the recess; and
wherein the notches are shaped and disposed to receive the protrusions when the first electronics assembly is mated to the second electronics assembly.

5. An electronics module system as set out in claim 1, further comprising:
a third RF electronics module having a flange extending away from the top surface of the third RF electronics module; and
a fourth RF electronics module having a flange extending away from the top surface of the fourth RF electronics module;
wherein: the first RF electronics module further comprises a recess on the top surface of the first RF electronics module receiving the flange extending away from the top surface of the third RF electronics module; and
the second RF electronics module further comprises a recess on the top surface of the second RF electronics module receiving the flange extending away from the top surface of the fourth RF electronics module.

6. An electronics module system as set out in claim 5, wherein the first, second, third, and fourth RF electronics modules operate at a first, second, third, and fourth differing frequency bands.

7. An electronics module system as set out in claim 1, wherein the electronics module system comprises an RF repeater adapted for a wireless network.

8. An electronics module, comprising:
a body having a top surface, a bottom surface, and first and second side surfaces both connecting the top surface to the bottom surface;
a flange extending from the top surface away from the second side surface, the flange disposed generally parallel with the top surface; and
a recess formed on an exterior of the top surface extending inward from the first side surface; recess walls of the recess having a shape generally inverse to the shape of the flange, and the recess walls with the generally inverse shape are configured to receive a second flange of a separate module.

9. An electronics module as set out in claim 8, further comprising a set of four pedestal mounts disposed at the corners of the bottom surface supporting the electronics module, wherein:
a first set of two pedestal mounts of the four pedestal mounts disposed adjacent to the second surface each have a protrusion extending away from the second surface; and
a second set of two pedestal mounts disposed adjacent to the first side surface each have a notch shaped and positioned to correspond with the protrusions.

10. An electronics module as set out in claim 8 further comprising an integrated handle coupled to the top surface.

11. An electronics module as set out in claim 8, wherein the flange is tapered such that the width of the flange distal to second surface is less than the width proximate to the second surface.

12. An electronics module as set out in claim 8, further comprising:
a threaded recess hole formed in the recess on the top surface; and
a flange through-hole formed in the flange, the flange through-hole positioned to correspond with the position of the threaded recess hole when coupled to another module.

13. An electronics module as set out in claim 8, further comprising:
front and back surfaces both connecting the top surface to the bottom surface, the front and back surfaces abutting the first and second side surfaces to form the body exterior;
a first set of vertical cooling fins disposed on the front surface; and
a second set of vertical cooling fins disposed on the back surface.

14. An electronics module as set out in claim 8 wherein the electronics module comprises an RF module.

15. is directed towards an electronic module comprising:
a body having a top surface, a bottom surface, and first and second side surfaces both connecting the top surface to the bottom surface;
a first recess formed on an exterior of the top surface extending inward from the first side surface; and the first recess is tapered such that the width of the first recess distal to the first side surface is less than the width of the first recess adjacent to the first side surface; and
a second recess formed on the exterior of the top surface extending inward from the second side surface and symmetrically oriented opposite to the first recess and the second recess is tapered such that the width of the second recess distal to the second side surface is less than the width of the second recess adjacent to the second surface configured symmetrically but opposite to the first recess.

16. An electronics module as set out in claim 15, further comprising a set of four pedestal mounts disposed at the corners of the bottom surface supporting the electronics module and providing a space having coupling connectors to interface with the bottom surface and extend to adjacent modules, wherein each of the four pedestal mounts have a notch extending inward toward the center of the bottom surface.

17. An electronics module as set out in claim 15, further comprising:
 a first threaded recess hole formed in the first recess on the top surface; and
 a second threaded recess hole formed in the second recess on the top surface.

18. An electronics module as set out in claim 15, further comprising:
 front and back surfaces both connecting the top surface to the bottom surface, the front and back surface abutting the first and second side surfaces to form the body exterior; and
 a set of vertical fins disposed on the front surface.

19. An electronics module as set out in claim 15, wherein the electronics module comprises a cellular communications base unit.

\* \* \* \* \*